June 7, 1966 M. L. HERNDON 3,254,770

FLUID FILTER

Filed Sept. 14, 1962

MARION L. HERNDON
INVENTOR
HUEBNER & WORREL
ATTORNEYS
BY
Richard M. Worrel

United States Patent Office 3,254,770
Patented June 7, 1966

3,254,770
FLUID FILTER
Marion L. Herndon, Fresno, Calif., assignor to Filter Equipment Sales Co., Fresno, Calif., a corporation of California
Filed Sept. 14, 1962, Ser. No. 223,773
3 Claims. (Cl. 210—232)

The present invention relates to a fluid filter for the improved preparation of raw milk and the like, and more particularly to such a filter which enables a faster flow of fluid therethrough to minimize solidification of constituents of the fluid prior to passage through the filter. The filter of the present invention also provides a container which has an improved filter constraining mechanism enabling the filter to be changed quickly and conveniently. While the structure of the present invention is described in connection with the filtering of raw milk, such filter is not restricted to such use but has general utility in filtering other fluids as well.

Conventional filtering devices for use in separating raw milk from the solids contained therein usually employ containers of frusto-conical or funnel-shaped configuration. Such containers provide a relatively large filler opening to accommodate a large volume. The milk is poured into the containers from gathering receptacles with the milk usually being at a temperature somewhat greater than room temperature. In order to accommodate a large volume of milk, the filter element is located near the bottom, or outlet end of the container in the smallest diameter portion thereof. The filter element thereby presents a minimum filtering area which quickly accumulates solids and is easily clogged necessitating frequent changes. The accumulation of solids on the filter also tends to restrict the flow of milk therethrough which extends the period of time the milk must remain exposed to the atmosphere in the upper portion of the container. Such exposure aggravates the problem in that the milk is allowed to cool and an appreciable amount of the desired fatty constituents solidify and are collected by the filter element.

Therefore, it is an object of the present invention to provide a fluid filter which affords improved separation of solids from the fluid while permitting a minimum of restriction to the flow of fluid therethrough.

Another object of the present invention is to provide such a fluid filter which permits a faster flow of fluid therethrough to decrease the exposure time of such fluid to the atmosphere.

Another object is to provide a fluid filter capable of extending the period of effective filtering between changes of the filter element.

Another object is to provide a fluid filter having a filter pad locking mechanism permitting fast, convenient changes of the filter.

Other objects and advantages of the present invention will become more readily apparent upon reference to the description in the specification.

Figures 1, 2:
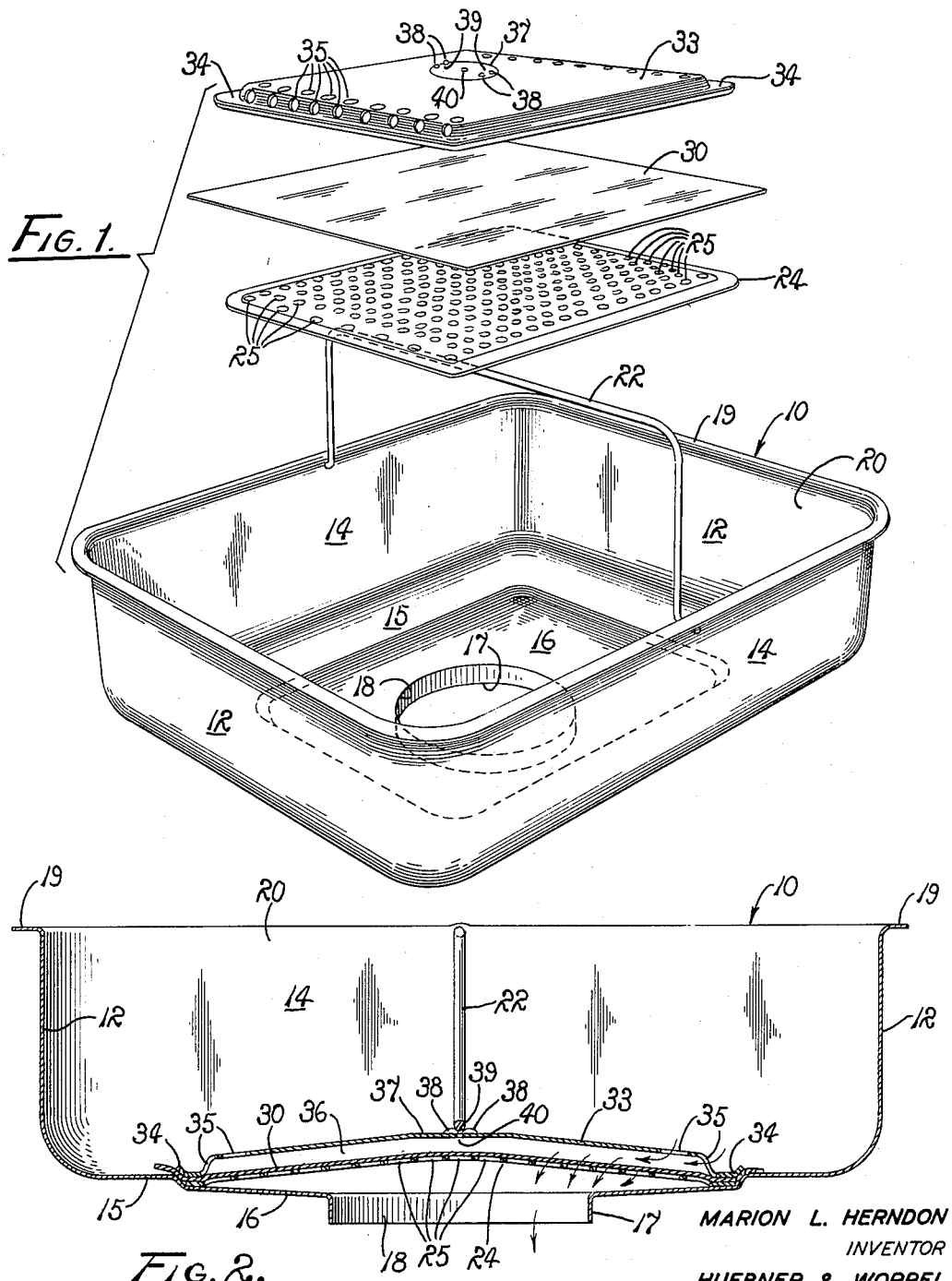
FIG. 1 is a perspective of a container for a filter embodying the principles of the present invention showing a filter element and its support and constraining members in exploded relation from a container therefor.
FIG. 2 is a vertical longitudinal section taken centrally of the container with the filter element and its supporting and constraining members shown in an assembled relation for filtering purposes.

Referring more particularly to the drawing, a substantially rectangular milk receiving container 10 includes opposite end and side walls 12 and 14 respectively and a bottom wall 15. The bottom, side and end walls of the container are formed of a single sheet of a noncorrosive, stain-proof, material, such as stainless steel, aluminum, or the like. The bottom wall has a centrally disposed symmetrically arranged recessed portion 16 which provides a circular depending lower flange 17 circumscribing an outlet opening 18 from the container. The flange 17 is of a diameter to fit the inlet opening of a conventional milk can or farm tank, not shown, in which operational environment the filter of the present invention is utilized. The end and side walls provide a continuously outwardly extended upper flange 19 which circumscribes an inlet or filler opening 20 of the container.

An elongated resilient rod-like U-shaped handle or bail member 22 is pivotally mounted at its opposite ends in the sides 14 of the container closely adjacent to the upper flange 19 and spans the container. A substantially rectangular filter support screen 24 of arcuately curved cross section is of a size to be nested within the recessed portion 16 of the bottom wall 15 of the container 10. The filter support screen has a plurality of closely spaced apertures 25 therethrough to provide a screen or grid-like surface to present a minimum restriction to flow of fluid therethrough. A substantially rectangular filter pad 30 of soft, pliable fluid pervious woven material, such as cotton or the like, overlies and is supported by the support screen 24 and is of a size somewhat to overlap the edges of the support screen.

A substantially rectangular baffle or filter clamping member 33 also of arcuately curved cross section includes a marginally depending arcuate lip 34 which constrains the filter pad 30 against the support screen 24 within the recessed portion 16 of the container. The baffle also includes sets of apertures 35 therethrough in longitudinally spaced relation at opposite ends of the baffle. The baffle and the filter pad define therebetween a fluid flow passage 36. The baffle also has a raised centrally disposed dome portion 37 which has a plurality of semi-spherical protuberances 38 raised from the dome to define a locking channel 39 therebetween. An air venting orifice 40 is formed centrally through the dome portion of the constraining member to relieve air of fluid trapped within the passage 36 between the constraining member and the filter pad 30.

*Operation*

The operation of the described embodiment of the subject invention is believed to be readily apparent and is briefly summarized at this point. In order to assemble the filter mechanism of the present invention for use, the container 10 is easily transported from its storage area to the milk preparation area by positioning the bail 22 in its substantially upright position of FIG. 1. In such position, the support screen 24 is readily received within the container to a position nested within the recessed area 16 of the container. A clean filter pad 30 is superimposed the support screen and the constraining member 33 is rested thereon in congruent overlying relation thereto and also nested within the recessed portion 16 of the container. The bail 22 is then swung downwardly within the container by pivotal movement of the bail in either direction of rotation which flexed sufficiently to snap over the protuberances in the dome portion of the constraining member dependably to lodge in the bail locking channel 39. The bail in such flexed locking position thereby exerts a compression force against the baffle to maintain the filter pad and the support screen in assembly. As shown in FIG. 2, the bail is elevated from the dome by the protuberances 38 so as not to obstruct the vent orifices 40. The container is then placed upon a conventional milk can or farm tank with the outlet opening 18 registered with the inlet of the can or tank. Raw milk from a suitable collecting receptacle, not shown, is poured into the container 10. Milk flows by gravity through the apertures 35 in the baffle 33 and substantially horizontally through the passage 36 over and through the filter pad 30. Solid impurities present in the milk are trapped by the filter pad to remain in the passage 36 between the filter pad and the baffle. The filtered milk is then funneled through the outlet opening 18 and deposited in the collecting can or tank therebelow.

After use, the filter mechanism of the present invention is easily disassembled for cleaning and storage. The bail 22 is readily manually flexed over the protuberances of the dome portion of the baffle and swung to the position of FIG. 1 to permit ready removal of the filter pad 30. With the above described structure, the filter pad is constructed of a size substantially larger than the conventional strainer pads for the purpose as it is not restricted to placement in the relatively small outlet opening from the container. With this arrangement, the milk flows faster through the filter, thereby reducing the period of time that the milk is exposed in the upper portion of the container and reducing solidification of the fatty constituents in the milk which tend to collect upon and clog the filter pad. The filter pad is readily and conveniently released by pivoting the bail member 22 and lifting the constraining member 33. In this arrangement, the bail not only provides a handle for the container during transport, but serves also as a locking member to hold the support screen, filter pad and baffle in an assembled operating position.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A fluid filter comprising a container having opposite continuous end and side walls, and an integral bottom wall, said bottom wall including a centrally disposed symmetrically arranged recessed portion and an outlet opening of a predetermined area within said recessed portion, said end and side walls circumscribing said bottom wall and defining a filler opening to the container; a filter support screen nested within said recessed portion of the bottom wall of the container having a portion in covering relation to said outlet opening and a portion overlapping the outlet opening to provide a filtering area greater than the area of the outlet opening; a filter pad of fluid pervious material rested in congruent relation on the support screen; a baffle superimposed on the filter pad having a marginal depending lip in nested relation within said recessed portion of the bottom wall of the container defining a substantially horizontal fluid passage between said filter pad and the baffle, said baffle having a plurality of apertures therethrough and a locking channel facing said filler opening of the container; and a U-shaped bail having opposite ends respectively pivotally mounted in the opposite side walls of the container adjacent to said filler opening for movement between a carrying position outwardly extended from the filler opening of the container, and a filter locking position disposed within the container in engagement with the locking channel of the baffle.

2. A fluid filter comprising a container having opposite continuous end and side walls, and an integral bottom wall, said bottom wall including a centrally disposed symmetrically arranged recessed portion and an outlet opening of a predetermined area within said recessed portion, said end and side walls circumscribing said bottom wall and defining a filler opening to the container; a filter support screen nested within said recessed portion of the bottom wall of the container and having a portion in covering relation to said outlet opening and a portion overlapping the outlet opening to provide a filtering area greater than the area of the outlet opening; a filter pad of fluid pervious material rested in congruent relation on the support screen and having a central portion in covering relation to the outlet opening and edge portions overlapping the outlet opening; a baffle superimposed on the filter pad having a marginal depending lip in nested relation within said recessed portion of the bottom wall of the container defining a substantially horizontal fluid passage between said filter pad and said baffle, said baffle having a plurality of apertures therethrough adjacent to said lip to direct fluid into said fluid passage initially upon said edge portions of the filter pad and thence upon said central portion of the filter pad, said baffle including a centrally disposed dome portion providing a plurality of semi-spherical protuberances struck outwardly therefrom toward said filler opening of the container defining a locking channel; and a resilient U-shaped bail having opposite ends respectively pivotally mounted in the opposite side walls of the container adjacent to said filler opening for movement between a carrying position outwardly extended from the filler opening of the container, and a filter locking position disposed within the container with the bail being flexed over said protuberances into the locking channel therebetween exerting a compressive force against said baffle to maintain said filter pad, said support screen and the baffle in assembly within the container.

3. A fluid filter comprising a substantially rectangular container having opposite continuously formed end and side walls, and an integral bottom wall, said bottom wall including a substantially rectangular centrally disposed symmetrically arranged recessed portion and a depending flange from the recessed portion circumscribing and defining an outlet opening from the container of a predetermined area, said end and side walls circumscribing said bottom wall and defining an opposite filler opening to the container; a substantially rectangular filter support screen of arcuately curved cross-section having a continuous edge portion nested within said recessed portion of the bottom wall of the container and having a portion in covering relation to said outlet opening and a portion overlapping the outlet opening to provide a filtering area greater than the area of the outlet opening; a substantially rectangular filter pad of fluid pervious material rested in congruent relation on the support screen having a central portion in spaced covering relation to said outlet opening and edge portions overlapping said outlet opening and said recessed portion of the bottom wall of the container; a substantially rectangular baffle of arcuately curved cross-section superimposed on the filter pad having a marginally depending lip engaging said filter pad in nesting relation within said recessed portion of the bottom wall of the container defining a substantially horizontal fluid passage between the baffle and the filter pad, said baffle having a plurality of apertures therethrough adjacent to said lip to direct fluid into said fluid passage initially upon said edge portions of the filter pad and thence upon said central portion of the filter pad, said baffle including a centrally disposed dome portion providing a venting orifice therethrough to relieve air trapped in said passage, said dome also providing a plurality of semi-spherical protuberances struck outwardly therefrom toward said filler opening of the container, said protuberances defining therebetween a locking channel; and a flexible rod-like U-shaped bail having opposite ends respectively pivotally mounted in the opposite side walls of the container adjacent to said filler opening for movement between a carrying position outwardly extended from the filler opening of the container, and a filter locking position disposed within the container with the bail being flexed over said protuberances into the locking channel therebetween exerting a compressive force against said baffle to maintain said filter pad, said support screen and the baffle in assembly within the container with the container being maintained in the same attitude in both bail positions.

References Cited by the Examiner

UNITED STATES PATENTS

| | | | |
|---|---|---|---|
| 1,097,415 | 5/1914 | Foss | 210—470 |
| 1,153,437 | 9/1915 | Miller | 210—482 |
| 1,421,622 | 7/1922 | Van Ness | 210—482 |
| 1,783,111 | 11/1930 | Dwight | 210—482 |
| 1,916,456 | 7/1933 | Yurkovitch | 210—482 |
| 1,946,943 | 2/1934 | Lewis | 210—482 |
| 2,193,508 | 3/1940 | Cordts | 210—315 X |
| 2,239,132 | 4/1941 | Ware | 210—482 |
| 2,336,348 | 12/1943 | Demers | 210—482 |
| 2,464,843 | 2/1945 | Becher | 210—481 |
| 2,559,133 | 7/1951 | Schultz | 210—470 X |

FOREIGN PATENTS 238,814   8/1925   Great Britain.

REUBEN FRIEDMAN, *Primary Examiner.*

ROBERT F. BURNETT, *Examiner.*

F. A. SPEAR, K. V. ROCKEY, *Assistant Examiners.*